United States Patent Office 3,388,886
Patented June 18, 1968

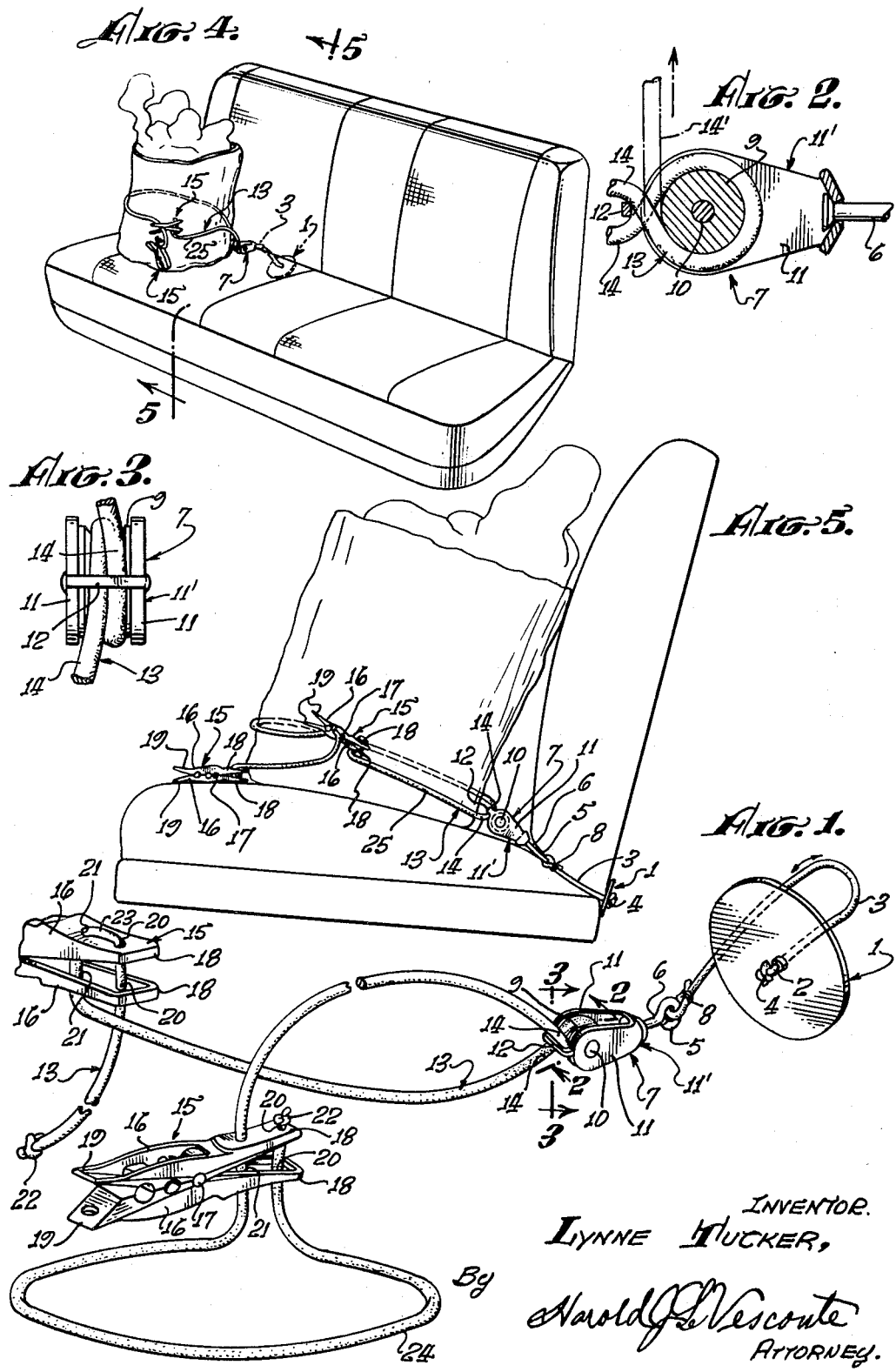

3,388,886
PACKAGE TETHERING DEVICE
Lynne Tucker, 3200 Parkvista Drive,
La Crescenta, Calif. 91014
Filed May 23, 1966, Ser. No. 552,082
5 Claims. (Cl. 248—361)

ABSTRACT OF THE DISCLOSURE

A package tethering means for use in securing packages, handbags and the like on motor vehicle seats comprising an elongated, cord-like tethering member having an anchoring means for engagement with a vehicle seat connected thereto by means affording the longitudinal adjustment of the tethering member relative to the anchoring means and each end of the tethering member having means for connecting the portion thereof at that side of the anchoring member into a package engaging and tethering instrumentality.

---

This invention relates to package securing or tethering means particularly for retaining packages and the like on the seats of motor vehicles.

It is a common practice for drivers of automobiles to place packages, handbags, and the like on the front seat of an automobile rather than in the trunk or on the floor of a vehicle, taking the risk that there will be no occasion for such a sudden stop as will cause the package or the like to be projected forward onto the floor. Such happenings are usually not very harmful to the articles thus projected off the seat, but a common reaction of the driver is to reach over with his or her right hand to restrain the articles thus not only leaving one hand only for manipulation of the steering wheel but resulting in a momentary distraction from a traffic situation when split second mental acuity may be most needed and such distraction, of course, increases the possibility of collision or other accident.

With this situation in mind, the principal object of the invention is to provide a simple tethering means including devices by which the said means may detachably be secured to an automobile seat structure and including other means operable to be removably secured to or about one or more packages or the like at such a distance from the seat attached devices as will retain the article or articles secured thereby on the seat cushion.

Other objects of the invention are: to provide a device of the above character which is small in size, is capable of compact storage when not in use, is of simple construction and capable of economical manufacture, is readily applied to and removed from a wide range of sizes of packages or the like, and which is generally effective for its intended purpose.

With the foregoing objects in view, together with such additional objects and advantages as may subsequently appear, the invention resides in the parts and in the construction, combination and arrangement of the parts described, by way of example, in the following specification of certain presently preferred embodiments of the invention, reference being had to the accompanying drawings which form a part of said sepcification and in which drawings:

FIG. 1 is a perspective view of a presently preferred embodiment of the invention, certain portions of a tethering cord component being broken out for compactness of illustration, FIG. 2 is a fragmentary enlarged scale, sectional view of a pulley block component of the device, the view being taken on the line 2—2 of FIG. 1, FIG. 3 is an end elevational view on the same scale as FIG. 2 of the pulley block component as viewed from the line 3—3 of FIG. 1, the tethering cord component being shown in section, FIG. 4 is a perspective view of an automobile seat with the device in a typical position of use, and FIG. 5 is an enlarged scale view on the line 5—5 of FIG. 4.

Referring to the drawings, the illustrated embodiment of the invention comprises an anchoring member 1, here shown as a rigid disk having a centrally disposed aperture 2 therethrough and through which one end of a flexible, preferably resilient, anchoring cord 3 extends and is secured by any suitable means, as for example, by forming a knot 4 therein. The other end of the anchoring cord extends through the eye 5 of a swivel means 6 of a pulley block assembly 7 and is secured by any suitable means as for example, a lashing 8. The pulley block assembly includes a grooved pulley 9 freely rotatably mounted on an axle pin 10 extending between the arms 11, 11 of the yoke member 11′ to which the swivel member 6 is secured.

The free ends of the yoke member arms 11, 11 are connected by a rectangular cross bar 12 and an elastic, fabric covered cord 13 constituting the package engaging and tethering component of the device is trained around the pulley 9 for a full circumferential engagement therewith with the bights 14, 14 thereof extending in opposite directions away from the pulley and passing between the pulley and the cross bar 12 as best shown in FIGS. 1, 2 and 3, the diameter of the cord 13 and the space defined by the face of the pulley 9, the adjacent faces of the arms 11, 11 and the cross bar 12 being such as to at least slightly compress the two bights 14, 14 of the cord 13. The result is that a pull on either bight 14 of the cord in a direction generally radially of the axle pin 10 so that the bight of the cord will be bent around one of the corner edges of the cross bar 12 will cause the engagement therewith plus the friction deriving from the complementary transverse movement of the other bight 14 where said bights cross each other to resist such pull. At the same time, a pull on either bight of the cord 13 in a direction generally tangentially with respect to the pulley 9, as indicated in dotted lines at 14′ in FIG. 2, will cause the cord to travel around and pass the pulley 9 to the extent desired. Accordingly, the cord can be shifted to many positions to which it may have been desired.

The opposite ends of the cord 13 are equipped with means affording quick detachable and quickly adjustable means for surrounding or gripping various types of articles and packages. A satisfactory form of such means is shown in detail in FIG. 1 as constituting a commercially available spring clothespin type of fastener 15 modified in a manner to be described, said fastener including a pair of elongated, rigid members 16, 16 disposed in mirror image relation to one another and being fulcrummed on one another intermediate their ends as at 17, each of said members having an operating handle end 18 and a jaw end 19 and said fasteners including spring means, not shown, tending constantly to urge the jaw ends thereof yieldingly toward each other and the opposing faces of the jaw ends having complementary transverse grooves for gripping a clothesline or the like. As thus far described, the said fasteners are standard articles of commerce. To adapt these fasteners for use in the present invention, the handle ends 18, 18 are provided one each with a first pair of holes 20, 20 extending therethrough in substantial axial alignment with each other and with a second pair of similar holes 21, 21 generally parallel to the holes 20, 20 but disposed slightly closer to the fulcrum point 17, all of said holes being of a diameter somewhat less than the normal diameter of the cord 13. The cord 13 is threaded through the holes 20, 20 and is then threaded through the holes 21, 21 in the opposite direction and secured by any suitable means as, for example, by forming a knot 22 in the end of the cord. The cord can be pulled back and forth through the holes with some difficulty wherefore, the fastener device may be thus disposed at the end of the cord or at any point therealong up to contact with the pulley means 7. The bight 23 extending between the holes 20 and 21 may be expanded as shown at 24 in FIG. 1 to form a loop of any desired size to encircle a package or other article. Alternatively, the bight 13 of the cord may encircle a package or the like as at 25 in FIGS. 4 and 5 and be secured in a loop by engagement with the transverse groove of the fastener jaws as shown in FIGS. 1 and 2. If desired, the cord 13 can be drawn through the pulley means 7 until one of the fasteners is in close proximity to the pulley means and the jaws of the fastener thus brought in close proximity to the pulley means used to engage the article to be secured by being caused to grip the handle of a handbag or the cord surrounding a package or the like.

In use, the anchor member is inserted between the back and seat cushions of the vehicle seat and caused to position itself at right angles thereto so as to lock itself against the seat back and rear edge of the seat cushion. This will position the pulley block means in close proximity to the juncture of the back and seat cushions as best shown in FIG. 5. The cord 13 and one or both of the fasteners is then arranged to encircle or otherwise secure the package or packages or other articles to be held on the seat in any of the manners above described as may be most convenient. When the device is not required, it can be readily removed and formed into a compact unit by coiling the anchor member and the tethering cord 13 and then securing the convolutions of the resulting coil together with the anchoring disk 1 by engagement with the jaws of the fastener members. Since the device may be employed to secure articles other than packages, e.g., handbags, articles of clothing, briefcases, etc., the term "package" as used in the specification and claims will be understood to include all articles which may be thus tethered by the device regardless of the specific nature of the articles thus secured.

While in the foregoing specification there has been described a presently preferred embodiment of the invention, the invention is not to be deemed to be limited to the precise details of construction thus disclosed by way of example and it will be understood that the invention includes as well all such changes and modifications in the parts and in the construction, combination and arrangement of parts as shall come within the purview of the appended claims.

I claim:
1. A package tethering device for retaining packages and the like on the seat of a motor vehicle, said device including an elongated, flexible tethering member and an anchoring means, said anchoring means comprising an elongated member having means at one end thereof operable for detachable engagement with a motor vehicle seat and means at the other end thereof adjustably engaging said tethering member with capacity for self-locking engagement with said tethering member at any point along said tethering member between the ends of said member, and at least one end of said tethering member carrying at least one fastener means independently adjustable along said one end of said tethering member and employable optionally to grippingly engage a package or to be caused to grippingly engage itself in the formation of a loop surrounding a package to be retained on the vehicle seat.

2. A package tethering device as claimed in claim 1 in which the mounting of said fastener means on said end portion of said tethering member permits said fastener to be shifted along of the portion said tethering member to which it is secured between the end of said portion and the point of engagement with said anchoring means, and in which the interconnection between said fastener and said tethering member automatically secures said fastener means against unintended movement from any position to which it may be moved.

3. A package tethering device as claimed in claim 1 in which said tethering member engages said fastener means at at least two spaced points and in which the bight of said tethering member between said two points may be employed as a package engaging loop.

4. A package tethering device as claimed in claim 1 in which the devices effecting the interengagement between said anchoring means and said tethering member includes means constantly operative to permit only intentional longitudinal adjustment of said tethering member relative to said anchoring means.

5. A package tethering device as claimed in claim 1 in which said fastener means comprises a spring biased clamp means comprising a pair of elongated rigid members pivoted on each other in side by side relation and each including a handle end and a jaw end and said fastener means further including spring means tending constantly to urge said jaw ends toward each other, in which said tethering member extends through said handle ends in spaced parallel runs with resultant formation of a bight between said runs employable to surround and secure a package, and in which the meeting faces of said jaw ends are grooved to receive a bight of said tethering member to form a package embracing loop.

References Cited
UNITED STATES PATENTS

| | | | |
|---|---|---|---|
| 1,991,633 | 2/1935 | Serpico | 297—385 X |
| 2,978,015 | 4/1961 | Cox | 297—385 |
| 3,174,798 | 3/1965 | Sprague | 297—385 |

ROY D. FRAZIER, *Primary Examiner.*
FRANK DOMOTOR, *Assistant Examiner.*